US010750241B2

(12) United States Patent
Picco et al.

(10) Patent No.: US 10,750,241 B2
(45) Date of Patent: Aug. 18, 2020

(54) BROWSING AND VIEWING VIDEO ASSETS USING TV SET-TOP BOX

(71) Applicant: Harmonic, Inc., San Jose, CA (US)

(72) Inventors: Martin R. Picco, Santa Cruz, CA (US); Noam Koren, Los Gatos, CA (US); Raz Nitzan, Cupertino, CA (US); Guo Feng Huang, San Francisco, CA (US); Ilan Ben-Zeev, Sunnyvale, CA (US)

(73) Assignee: Harmonic, Inc., San Jose, CA (US)

(*) Notice: Subject to any disclaimer, the term of this patent is extended or adjusted under 35 U.S.C. 154(b) by 184 days.

(21) Appl. No.: 14/935,791

(22) Filed: Nov. 9, 2015

(65) Prior Publication Data

US 2016/0134939 A1 May 12, 2016

Related U.S. Application Data

(63) Continuation of application No. 12/351,307, filed on Jan. 9, 2009, now Pat. No. 9,185,351.

(Continued)

(51) Int. Cl.
*H04N 21/20* (2011.01)
*H04N 21/231* (2011.01)
*H04N 21/234* (2011.01)
*H04N 21/2343* (2011.01)
*H04N 21/24* (2011.01)
*H04N 21/262* (2011.01)
*H04N 21/433* (2011.01)

(Continued)

(52) U.S. Cl.
CPC ....... *H04N 21/47202* (2013.01); *G11B 27/10* (2013.01); *H04N 7/17336* (2013.01); *H04N 21/26258* (2013.01); *H04N 21/435* (2013.01);

*H04N 21/482* (2013.01); *H04N 21/8193* (2013.01); *H04N 21/8456* (2013.01)

(58) Field of Classification Search
None
See application file for complete search history.

(56) References Cited

U.S. PATENT DOCUMENTS 7,716,662 B2 * 5/2010 Seiden ................. G06F 8/61
717/173
2003/0074474 A1 * 4/2003 Roach ................. H04L 29/06
709/246

(Continued)

*Primary Examiner* — Brian T Pendleton
*Assistant Examiner* — Jean D Saint Cyr
(74) *Attorney, Agent, or Firm* — Brokaw Patent Law PC; Christopher J. Brokaw

(57) ABSTRACT

Roughly described, a system and method for delivering video content to a user's client device in a video-on-demand (VOD) system, which includes providing a collection of video segments, the segments having a predefined default sequence; establishing a streaming video session according to a session-oriented protocol; transmitting toward the client device a script executable by the client device, the script operable to transmit navigational codes toward the head-end equipment in response to and indicating user selection among navigational choices; beginning transmission of the video segments in the collection toward the client device in accordance with the default sequence of segments; and in response to receipt of one of the navigational codes, and without tearing down the streaming video session, altering the transmission sequence to jump to the segment that the user selected.

20 Claims, 9 Drawing Sheets

Related U.S. Application Data

(60) Provisional application No. 61/020,134, filed on Jan. 9, 2008.

(51) Int. Cl.
    *H04N 21/4402*     (2011.01)
    *H04N 21/482*     (2011.01)
    *H04N 21/658*     (2011.01)
    *H04N 21/472*     (2011.01)
    *H04N 7/173*     (2011.01)
    *H04N 21/435*     (2011.01)
    *H04N 21/81*     (2011.01)
    *H04N 21/845*     (2011.01)
    *G11B 27/10*     (2006.01)

(56) References Cited

U.S. PATENT DOCUMENTS

| | | | | |
|---|---|---|---|---|
| 2003/0088876 | A1* | 5/2003 | Mao | H04N 7/17336 |
| | | | | 725/91 |
| 2005/0058149 | A1* | 3/2005 | Howe | H04L 47/10 |
| | | | | 370/428 |
| 2007/0033282 | A1* | 2/2007 | Mao | H04N 21/2181 |
| | | | | 709/226 |
| 2007/0180479 | A1* | 8/2007 | Gravina | G06F 3/0231 |
| | | | | 725/87 |
| 2007/0250649 | A1* | 10/2007 | Hickey | G06F 13/385 |
| | | | | 710/62 |
| 2008/0005130 | A1* | 1/2008 | Logan | G06Q 30/06 |
| 2008/0109853 | A1* | 5/2008 | Einarsson | H04L 65/1006 |
| | | | | 725/62 |

\* cited by examiner

All segments sequentially

All segments sequentially

BROWSING AND VIEWING VIDEO ASSETS USING TV SET-TOP BOX

This application is a continuation of, and claims priority to, U.S. non-provisional patent application Ser. No. 12/351,307, filed Jan. 9, 2009, entitled "Browsing And Viewing Video Assets Using TV Set-Top Box," the contents of which is hereby incorporated by reference for all purposes as if fully set forth herein.

U.S. non-provisional patent application Ser. No. 12/351,307, filed Jan. 9, 2009 claims priority to, provisional patent application No. 61/020,134, filed Jan. 9, 2008, the contents of which is hereby incorporated by reference for all purposes as if fully set forth herein.

BACKGROUND

The invention relates to methods and systems for browsing video assets such as video-on-demand videos and internet videos. In particular, it relates to techniques for enabling such browsing and viewing in a "lean-back" environment such as before a television monitor.

Traditional TV operators such as cable companies (e.g. Comcast), direct broadcast satellite companies (e.g. DirecTV), IPTV companies (e.g. ATT) and broadcasters are concerned about the explosive growth of media consumption on the Internet and are seeking ways to incorporate this content into their service offerings. One of the main differentiators of the viewing experience provided by these operators as against the Internet experience is that it is delivered to TVs for viewing in a "lean back" environment in a living room, whereas the Internet experience is typically referred to as a "lean forward" experience in front of a computer.

At the same time, new companies are delivering content "over the top" of the existing TV service, using the Internet as a delivery mechanism. These companies are referred to as Over the Top (OTT) operators. So far this content is delivered to the PC, and some extender devices are emerging to enable content downloaded or streamed in this manner to be displayed on the TV. New devices are coming which deliver content directly from the Internet to the TV, without the PC.

There are several key challenges in delivering Internet content to the TV. These include:

Internet content is generally encoded at a lower resolution (e.g. 320×240) than the TV, which might be up to 1920×1080 for High Definition (HD).

Existing TV systems use either the MPEG2 or MPEG4 AVC compression standards, whereas the Internet uses encoding such as Flash, Windows Media and QuickTime. The vast majority of deployed set-top boxes (STBs) cannot decode and display content encoded in the Internet formats.

There is a vast amount of content available on the Internet. However, there is no convenient way to search for content using a TV remote control. (For example typing search terms using a remote control is very cumbersome.)

When setting up a session to play movies on existing video-on-demand (VOD) systems, the set-top box (STB) must communicate with a session manager, which interacts with billing and subscriber management systems to ensure that the STB has the proper rights to view the content; this process can take many seconds to complete. Since many Internet clips are very short, ranging from tens of seconds to a few minutes, the delay associated with treating each of these clips as a separate asset and incurring the delay associated with session setup is annoying to users accustomed to quicker response on the Internet.

There are existing STBs deployed in tens of millions of homes, and the majority of these STBs are older models with limited capability. Deploying new client applications is very difficult and time consuming, limiting where and how quickly they can be deployed An opportunity arises to provide mechanisms and techniques that enable better and more usable delivery of Internet content to the TV, in spite of the difficulties described above.

SUMMARY

The systems described herein solve many of these problems and enable traditional TV operators and new OTT operators to deliver a fun, new lean-back experience to the TV audience. Not only can the techniques described herein improve the delivery of short internet clips to a TV set-top box, but clever use of the techniques also enable an entirely new "lean-back" experience allowing the viewer to navigate conveniently among all kinds of assets, including conventional VOD movies.

Roughly described, the invention involves a system and method for delivering video content to a user's client device in a video-on-demand (VOD) system, which includes providing a collection of video segments, the segments having a predefined default sequence; establishing a streaming video session according to a session-oriented protocol; transmitting toward the client device a script executable by the client device, the script operable to transmit navigational codes toward the head-end equipment in response to and indicating user selection among navigational choices; beginning transmission of the video segments in the collection toward the client device in accordance with the default sequence of segments; and in response to receipt of one of the navigational codes, and without tearing down the streaming video session, altering the transmission sequence to jump to the segment that the user selected.

The above summary is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to particular embodiments thereof, and reference will be made to the figures, in which.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

In one embodiment, the system described herein enables operators to deliver collections of video clips from the Internet in a manner which makes them easily accessible and viewable directly on TVs with little or no modification to existing STBs. In an embodiment, these collections usually contain 10-20 items, such as "most popular clips on YouTube", "funniest videos on Yahoo", "top stories from ABC News", etc. The system fetches these collections on a pre-defined schedule and adapts them as necessary to make them compatible with the TV. This adaptation addresses issues with resolution, encoding and syntax of the clips as well as the layout of the clips on the TV screen together with navigation information. The result is a very easy to use way to access the most desirable Internet content on a TV using a simple remote control. In addition, many of the same techniques can be used to simplify user navigation among video clips and even full-length movies, by delivering a navigational collection of video clips prepared specifically for this purpose.

Figure 1:
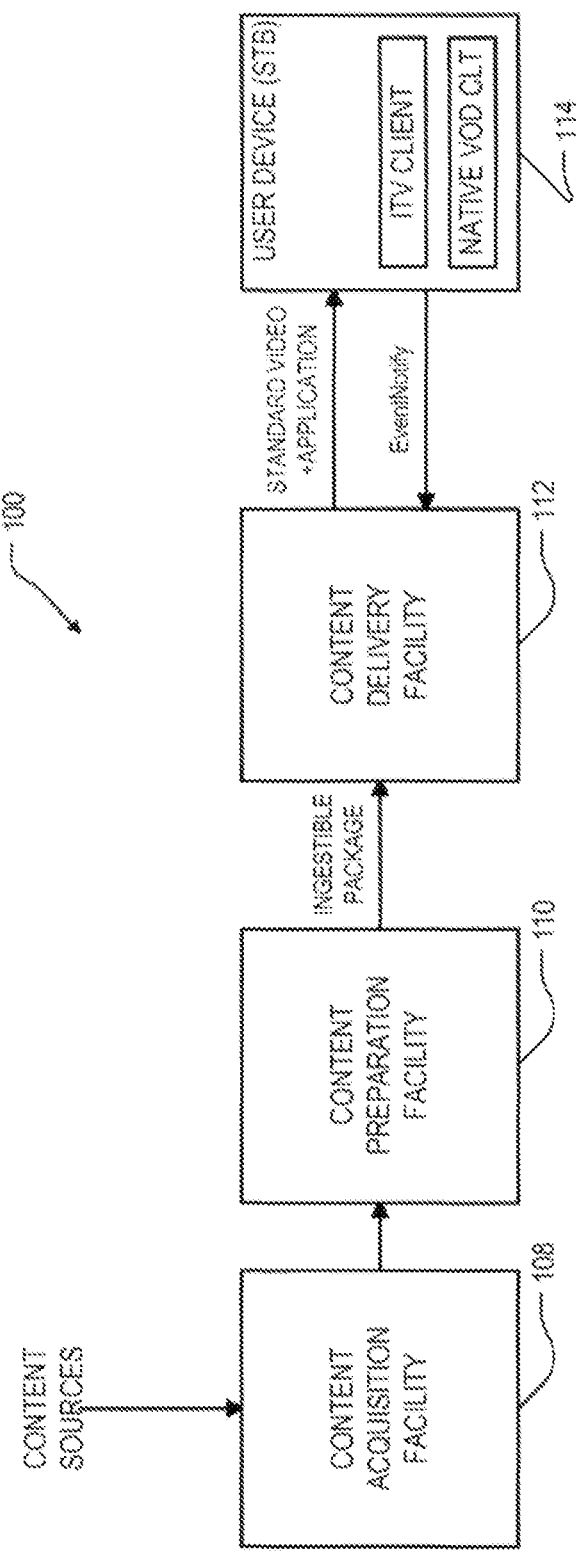
FIG. 1 is a block diagram of the overall architecture of a system incorporating features of the invention.

FIG. 1 is a block diagram of the overall architecture of a system 100 incorporating features of the invention. It includes a content acquisition facility 108 which acquires content from appropriate content sources, such as the internet and local storage devices. The system also includes a content preparation facility 110 which is responsible for processing the content into "ingestible packages" of collections that can be used by downstream components in the system. The system also includes one or more content delivery facilities 112, which in cable TV systems are sometimes referred to as "head-end equipment". Delivery facilities 112 are responsible for transmitting user-requested content to the end user's set-top box 114. This content can include not only content prepared by the content preparation facility 110, but also conventional videos and streaming TV programs. The system also includes one or more user or client devices 114, often the same as what is commonly referred to as a set-top box (STB). For convenience, user device 114 is often referred to herein as an STB, although it need not strictly qualify as an STB in all embodiments. The STB is responsible for receiving videos from the content delivery facility, decoding them and presenting them to a video monitor or display for viewing by the user. The STB includes, among other things, a video-on-demand (VOD) client and an interactive TV (ITV) client. It also is able to receive and install small application scripts from the content delivery facility for the ITV client. The STB is also the device that receives IR signals from the user's remote control device. If the signal from the remote requires a notification to be transmitted back upstream to the content delivery facility 112, that function, too, is performed by the STB.

Content Acquisition

Content acquisition facility 108 in one embodiment fetches internet content for use in the system. Content is fetched off the Internet using publically available Application Programming Interfaces (APIs) meant for programmatic access to media content from a variety of sources on the Internet.

The selection of which Internet content should be gathered and how it should be grouped to form collections is controlled via a Graphical User Interface (GUI) as well as programmatically through an XML interface. The operator of the GUI (who might be the service provider or end user) defines which collections are of interest and where to obtain them. The operator also selects among several options regarding how the collections should be displayed.

Typical collections are such things as "Most popular videos on YouTube", "Most funny clips from Yahoo", "Top Stories from ABCnews.com", or "Top Plays of the Week from ESPN". Each collection typically contains a limited set of Internet assets, such as 10-20.

In an embodiment, collections are defined using the following properties:

| Property | Description |
| --- | --- |
| Collection Name | Name of the collection to be fetched (e.g. "Top Stories from cnn.com") |
| Collection Description | Description of the collection. |
| URL | Web Uniform Resource Locator (URL) from which video clips can be fetched. |
| Protocol | Protocol to be used. Two major protocols are MRSS, which is defined by Google and Yahoo, and iTunes, which was created by Apple. Other protocols or APIs can be added as necessary. |
| Search Phrase | Phrase that defines the search whose result constitutes the collection. |
| Schedule | A property that defines the schedule that should be used to fetch the collection. |
| Size Limit | Maximum number of clips to be included in the collection. |
| Display Template | Selection of which navigation template should be used for creating the composite asset from the collection. |

Other properties might also be included to accommodate the requirements of varying implementations. For example, in systems that use the CableLabs® ADI metadata in conjunction with their VOD assets, additional fields necessary to create the appropriate metadata might also be included. ADI (Asset Distribution Interface) is a mechanism defined by CableLabs® to be used as a standard means of distributing assets for cable VOD systems. This specification is also used in some other non-cable VOD systems as well.

The acquisition facility 108 maintains a database of these collection definitions. These definitions can be created, updated and maintained by users. In a simple implementation, service operators use the acquisition facility's GUI to define collections, edit their properties, and check on their status. In more sophisticated implementations, the acquisition facility 108 is controlled through a web service, enabling end users to define collections of their own.

The acquisition facility 108 uses the collection definitions to maintain a schedule of collections to be fetched. Whenever it is time for a collection to be fetched, the acquisition facility 108 uses the collection definition to contact the appropriate sources to obtain the clips and metadata that should be used to create the collection. For an internet video collection, the acquisition facility 108 fetches clips from the appropriate web services. For a VOD selection asset, the acquisition facility 108 may fetch movie trailers, posters and other information from an asset management system.

The acquisition facility 108 may also be integrated with one or more advertising delivery systems to fetch advertising or other value added information to be used in conjunction with each collection. Each time a collection is fetched, data associated with the collection is sent to an ad targeting system to obtain an ad or set of ads to be displayed as part of the collection. The data sent includes the name and description of the collection, together with the name and description of each clip contained in the collection.

Once all the clips, ads and associated data have been fetched, the acquisition facility 108 creates a job and sends it to the preparation facility 110. The job contains all of the assets, metadata and instructions necessary for the preparation facility 110 to create a package containing each desired collection.

Package Preparation

For each job, preparation facility 110 uses the clips, ads and metadata to spatially and temporally combine the clips to into a single composite asset that embeds a simple navigation interface. As described in more detail hereinafter, the navigation interface gives the user visual cues to make the use of simple remote control commands such as left and right buttons to jump to previous and next clips in the collection, as well as up and down buttons to jump to previous and next collections.

The Preparation facility 110 might perform one or more operations on the incoming assets to create the new composite asset. These operations include, but are not limited to:

Adaptation of video and audio encoding formats from that used on the Internet to that which is suitable for the target delivery platform (e.g. from Flash to MPEG-2);
Video resizing
Video composition (combining multiple elements spatially into a single image)
Video rate changing
Logo and advertising insertion
Insertion of visible navigational cues
Metadata insertion In some embodiments, the preparation facility 110 performs the process of combining all the elements into a single package ready for presentation, and in other embodiments some of the combining steps are implemented in the Delivery component in order to improve the flexibility of the system.

In one embodiment, jump navigation to previous and subsequent positions within the package corresponds to navigation to the start of previous and subsequent video clips. In other embodiments, jump navigation can be to the start of video "segments", which need not correspond to the start positions of internet-retrieved video clips. As used herein, the available jump-to points for user navigation are what defines the "segments". Most segments are derived from one or more internet-retrieved clips, but some segments are not; for example some segments can contain purely advertising. Some segments also can be shorter than a clip (e.g. a clip can be divided into multiple segments), and other segments can include all or parts of more than one clip sequentially. As used herein, a "segment" already includes any spatial compositing, advertising, and visible navigational cues.

In order for the terms 'previous' and 'next' to have meaning in the context of a collection, the preparation facility 110 also defines a default sequence for the included segments. That is, the segments in the package will play in accordance with the default sequence unless the sequence is altered, for example in response to a user's selection of a navigational control on the remote. As used herein, the term "sequence" is broad enough to include not only linear sequences, but also sequences that include prescribed deviations from the linear, such as looping over one or more segments in the package, or over the entire package, branching, and pause-and-wait positions. The default sequence is specified in metadata in the package as described below.

Example Assets

Figure 2:
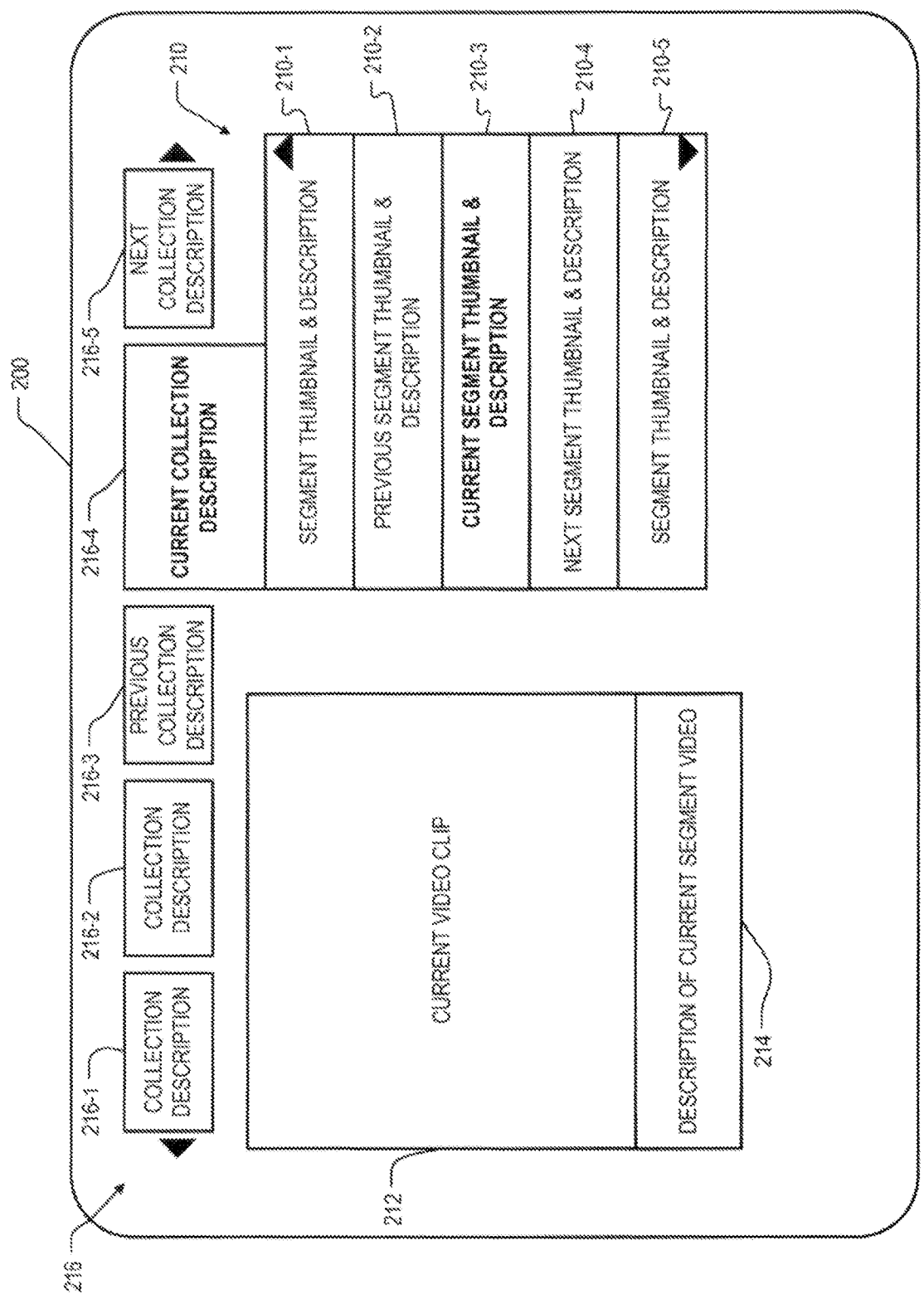
FIGS. 2-5 illustrate frames of screen layouts for respective types of video assets

The preparation facility 110 can be programmed to use any desired screen layout for a package. Templates are used in one embodiment to program the preparation facility 110. FIG. 2 illustrates a frame of the screen layout for one type of asset, such as a collections of internet clips. As can be seen a number of items have been spatially composited in the frame. In particular, region 210 (including (from top to bottom) sub-regions 210-1, 210-2, 210-3, 210-4 and 210-5) identifies visibly to the user, five of the clips in the current collection. Each sub-region includes both a thumbnail image and a textual description, but in another embodiment only one of the two, or some other indication, need be shown. The thumbnail image was created and composited into the image automatically by the preparation facility 110, from the internet video clip corresponding to the respective segment. The sub-region 210-3 is highlighted to indicate that it is the "current" segment, and up- and down-arrows are shown to help cue the user to the ability to jump to the previous or next segment 210-2 or 210-4 respectively, by pressing up or down buttons on the remote. Thus the thumbnails and textual descriptions in the sub-regions corresponding to the previous and next video segments, together with the up- and down-arrows, visibly pre-indicate the segments that are previous and next in the default sequence, and what buttons to press to jump to them.

Region 212 displays the current video clip. Unlike region 210, the display in region 212 is a moving image, specifically the internet video clip corresponding to the thumbnail and description in sub-region 210-3. In region 214 the description of the current video clip is repeated, perhaps with additional information like a time slider that moves as the playing of the clip progresses.

Across the top of the display, in region 216, are five sub-regions (from left to right) 216-1, 216-2, 216-3, 216-4 and 216-5. Each sub-region contains a textual description of a different collection of video segments, and the sub-region 216-4 is highlighted to indicate that it is the "current" collection. The "previous" collection is described in region 216-3, and the "next" collection is described in region 216-5. Again, whereas only textual descriptions of the collections are shown in the embodiment of FIG. 2, in another embodiment thumbnails and/or other visual indications of the collection's contents can be shown. Additionally, left- and right-arrows are shown in region 216, to help cue the user to the ability to jump to the previous or next collection 216-3 or 216-5 respectively, by pressing left or right buttons on the remote. Thus as with region 210, the textual descriptions in the sub-regions corresponding to the previous and next collections, together with the left- and right-arrows, visibly pre-indicate the collections that are previous and next in a predefined sequence, and what buttons to press to jump to them.

Each of the segments in the collection has a duration equal to the duration of the corresponding video clip shown in region 212. The picture sequence within the segment has been spatially pre-composited with all the component regions shown in FIG. 2, by the preparation facility 110, and encoded into the package containing the current collection. Some portions of the picture sequence change during the progress of the segment, such as the video clip playing in region 212 and the progress indicator in region 214, while other portions remain stationary for all pictures in the picture sequence, such as the regions 210 and 216. This preparation gives the viewer a sense that internet video is playing in one window (region 212) on the display while no video is playing in other parts of the display; much like one would see while playing an internet video on a computer monitor. In actuality, however, the picture sequence being delivered to the STB includes everything on the display screen in each picture, the apparently stationary portions simply being unchanged from picture to picture within the segment.

If the user presses the 'up' button on the remote, a signal is sent from the STB upstream to the content delivery facility 112 as described hereinafter, which causes the content delivery facility 112 to stop transmitting the current video segment, and to jump as requested to the previous segment pre-indicated in region 210-2 in the current segment. The content delivery facility 112 then begins transmitting from the beginning of the requested segment. In this segment the video has been pre-composited to show the corresponding internet video clip in region 212, and to pre-indicate five segments of the collection in region 210. Within this segment, the segment previously described in sub-region 210-1 is now shown in region 210-2; the segment previously described in sub-region 210-2 (identified previously as the "previous" segment) is now shown in region 210-3 (highlighted to indicate that it is now the "current" segment); the segment previously described in sub-region 210-3 (previously the "current" segment) is now shown in region 210-4 (now indicated as the "next" segment); and the segment previously described in sub-region 210-4 (previously the "next" segment) is now shown in region 210-5. An earlier segment in the default sequence is now described in sub-region 210-1. The effect is to simulate that the list of segments has scrolled downward, whereas in actuality the entire video segment merely has been pre-composited by the preparation facility 110 with the new information in region 210.

If the user presses the 'left' or 'right' button on the remote, a different signal is sent from the STB upstream to the content delivery facility 112, which causes it to stop transmitting the current video segment and to jump as requested to the previous or next collection, respectively, as pre-indicated in sub-region 216-3 or 216-5, respectively. In one embodiment transmission always resumes from the beginning of the first segment of the requested collection (as defined by the default sequence of the requested collection). In another embodiment transmission could resume from some other position in the requested collection. In either embodiment the collection descriptions in region 216 appear to scroll to the left or right, though in actuality the video segments in the requested collection have merely been pre-composited by the preparation facility 110 with the revised arrangement of collection descriptions.

It can be seen that though the user experience is computer-like, in actuality what is being delivered to the STB for each segment is merely a conventional video with computer-like information cleverly composited into regions of the pictures spatially. The composite images shown in FIG. 2 are not created dynamically in the STB 114 or even the delivery facility 112. Rather, they are created upon creation of the package by the preparation facility 110, after it is know what video clips will be included in each collection and in what sequence. That information is fixed at that time, so that the thumbnails and other visible cues can be created and spatially composited with each clip. From that time forward, the spatially composited images are treated simply as images; the STB does not need to know either that the clip currently being viewed occupies only a portion of the frame, nor that other regions of the frame derive from different clips. So far as the STB is concerned, it is receiving and displaying merely a standard video sequence of pictures. Because of this, conventional STBs are typically usable in the present system without modification.

A wide variety of look-and-feels can be constructed in this manner. For example, whereas for the illustration of FIG. 2 all the segments in all the collections have the same spatial layout, is would be simple for different collections to have different layouts appropriate to their content, or different segments within a single collection to have different layouts. It is all a matter of appropriately programming the spatial composition that the preparation facility 110 will use in creating the various video segments.

Figure 3:
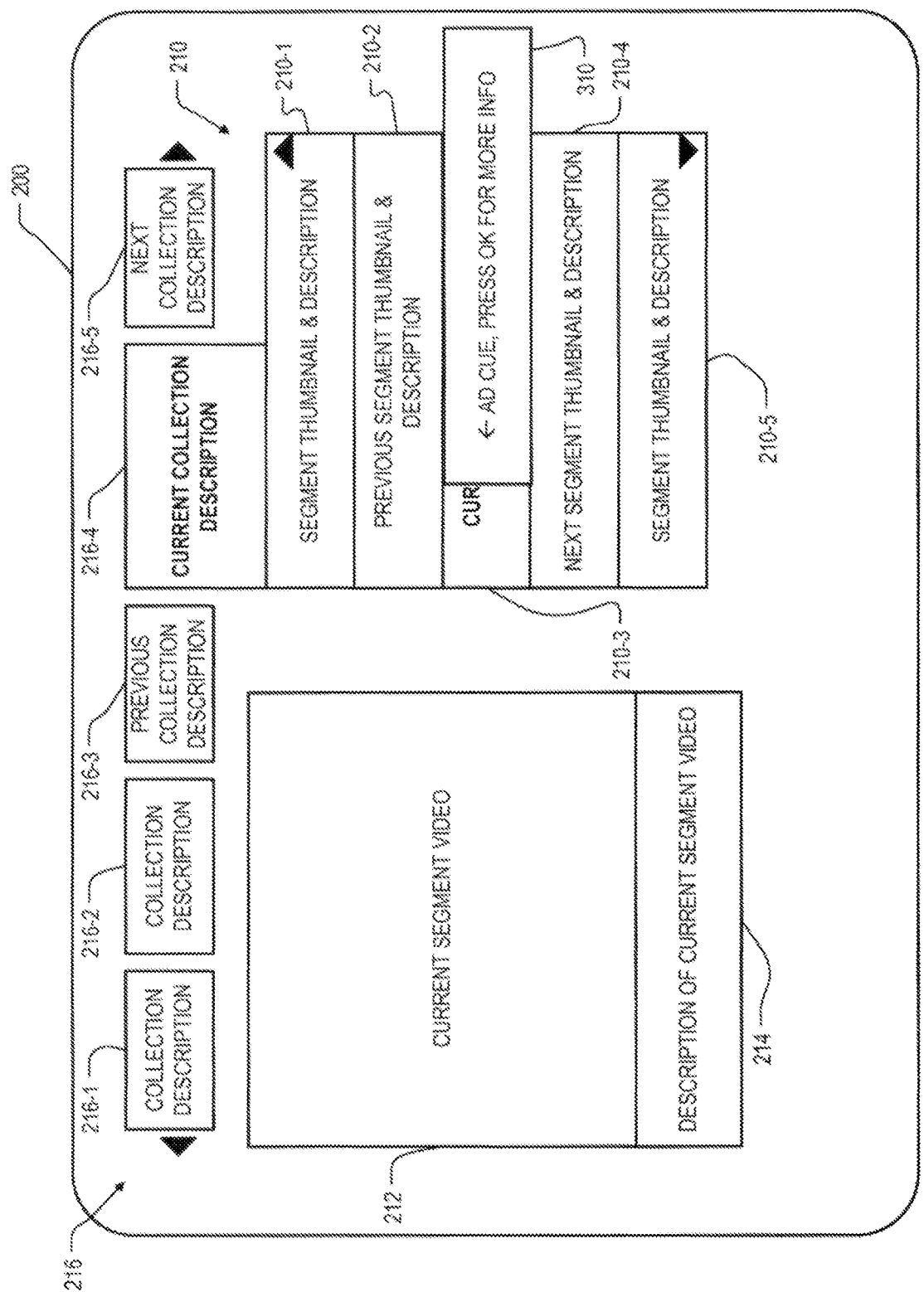

FIG. 3 illustrates a variation which includes an advertisement. The layout is the same as that shown in FIG. 2, except that one of the segments includes, part-way through, a region 310 that moves in from the right of the screen to partially obscure the description of the current segment, while the video clip corresponding to the current segment continues to play in region 212. Again, this call-to-action feature is pre-composed into the video segment, not inserted on-the-fly. The region 310 cues the user to an advertisement, and cues the user to press the OK button on the remote for more information. As with the segment descriptions in region 210 and the collection descriptions in region 216, the ad description in region 310 pre-indicates the video segment that will be delivered upon pressing the OK button. The segment that will be delivered in this case is not part of the current collection or package, however, and pressing the OK button causes the content delivery facility 112 to leave the confines of the prepared content. The ad in this case is a separate video, prepared and delivered to the STB entirely conventionally.

Figure 4:
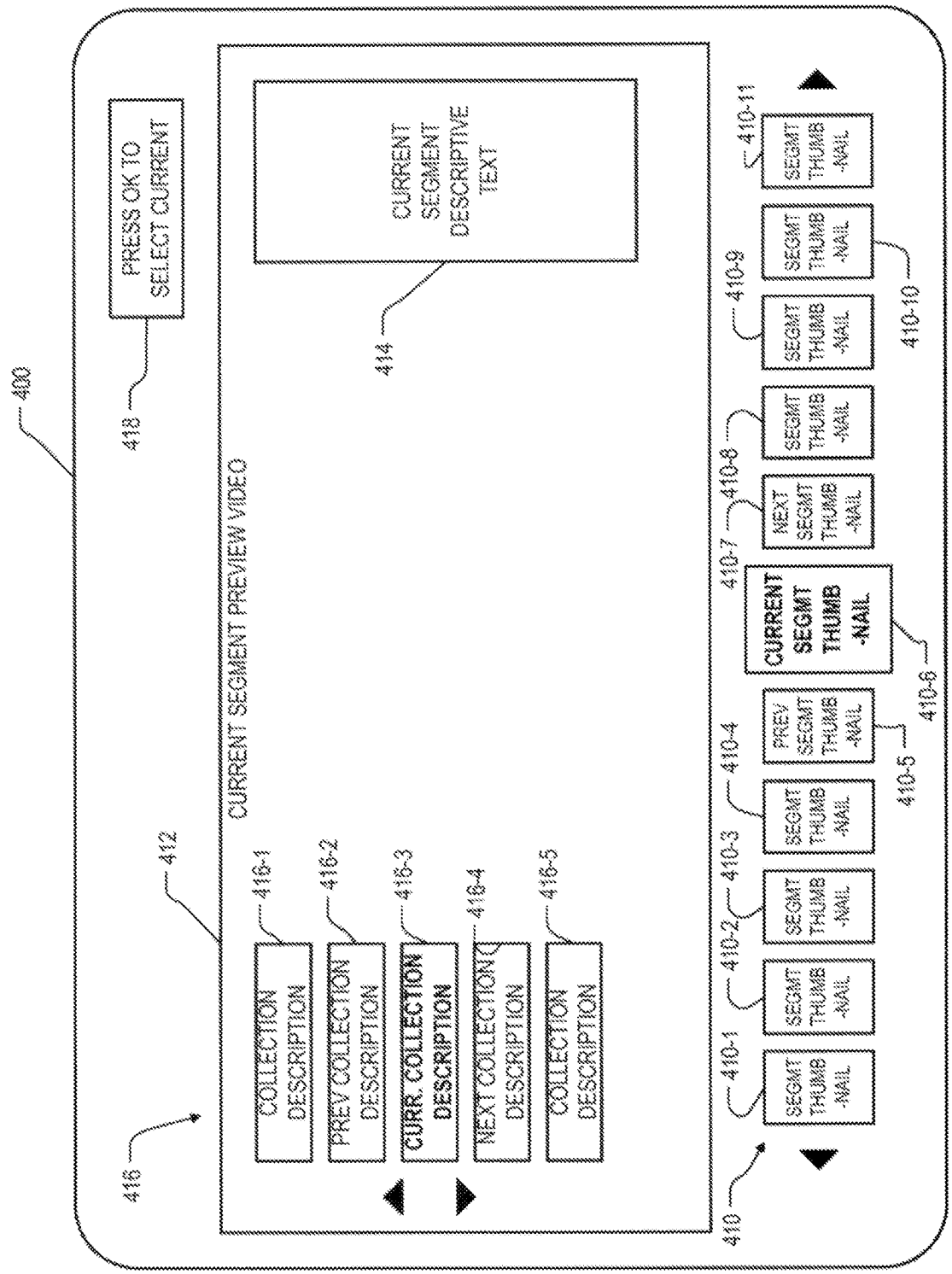

FIG. 4 illustrates a frame of the screen layout 400 for another type of collection, such as for user selection of a VOD movie. As with the arrangement of FIG. 2, a number of items have been spatially composited in the frame. In particular, region 410 contains sub-regions 410-1 through 410-11, each showing a thumbnail of a respective movie poster. In large region 412 the movie trailer corresponding to the "current" thumbnail is playing, and in region 414, superimposed on the region 412, a brief textual description of the current movie is shown. In the region 410, the middle sub-region 410-6 is highlighted to indicate that this is the "current" thumbnail. The region 410 also includes left- and right-arrows to help cue the user to the ability to jump to the previous or next segment 410-5 or 410-7, respectively, by pressing left or right button on the remote. Thus the thumbnails in the sub-regions corresponding to the previous and next video segments, together with the left- and right-arrows, visibly pre-indicate the segments that are previous and next in the default sequence within the current collection, and what buttons to press to jump to them.

Similarly, pre-composed in region 416, also superimposed on the region 412, are five sub-regions showing text which describe five different collections. The sub-regions (from top to bottom) are sub-region 416-1 describing one of the collections; a region 416-2 describing a "previous" one of the collections; a region 416-3 describing a "current" one of the collections; a region 416-4 describing a "next" one of the collections; and another region 416-5 describing yet another one of the collections. The text in region 416-3 is highlighted to indicate that this is the "current" collection. As in FIG. 2, up and down arrows in region 416 cue the user on the ability to jump to previous and next segments, described by previous and next thumbnails 410-5 and 410-7 respectively, by pressing up or down buttons on the remote. Thus the thumbnails and textual descriptions in the sub-regions corresponding to the previous and next collections, together with the up- and down-arrows, visibly pre-indicate the previous and next collections, and what buttons to press to jump to them.

While the thumbnails 410 pre-indicate to the user the various movies represented in the collection, they represent to the system the various video segments which correspond to the movies. As with the illustration of FIG. 2, the arrangement of thumbnails in region 410, which appears to remain fixed throughout the playing of the "current" movie trailer, is actually pre-composed with the moving trailer video in region 412, but merely remains unchanged during the entire duration of the trailer. If the user presses the 'right' button on the remote, the STB sends a message to the content delivery facility 112 to jump to the video segment which is next in the default sequence of the current collection, which is the segment associated with the movie pre-indicated by the movie poster thumbnail in sub-region 410-7. In the new segment, region 412 begins showing the trailer associated with the indicated movie, the region 414 shows descriptive text for the indicated movie, the collection descriptions in region 416 remain unchanged, and the thumbnails in region 410 are shifted by one sub-region toward the left, so that the thumbnail that was previously in region 410-7 now appears in the sub-region 410-6, where it is highlighted to indicate that this is now the 'current' movie. Again, no scrolling of the sub-regions 410 has actually occurred; the appearance of scrolling has been achieved merely because in the video segment for the now-current movie, the now-appropriate set of thumbnails has been pre-composed into the region 410.

Also pre-composed in the layout of FIG. 4, is a region 418 which notifies the user to press OK to select the current movie (the movie corresponding to the "current" video segment). Together with the current segment thumbnail in region 410-6, the current segment descriptive in region 414, and the movie trailer playing in region 412, the legend in region 418 pre-indicates the video that will be delivered upon pressing the OK button. As with the advertisement in FIG. 3, the video segment that will be delivered in this case is not part of the current collection or package. Pressing the OK button in this embodiment causes the content delivery facility 112 to leave the confines of the prepared content and to deliver the selected movie as a separate video, prepared and delivered to the STB entirely conventionally.

Figure 5:
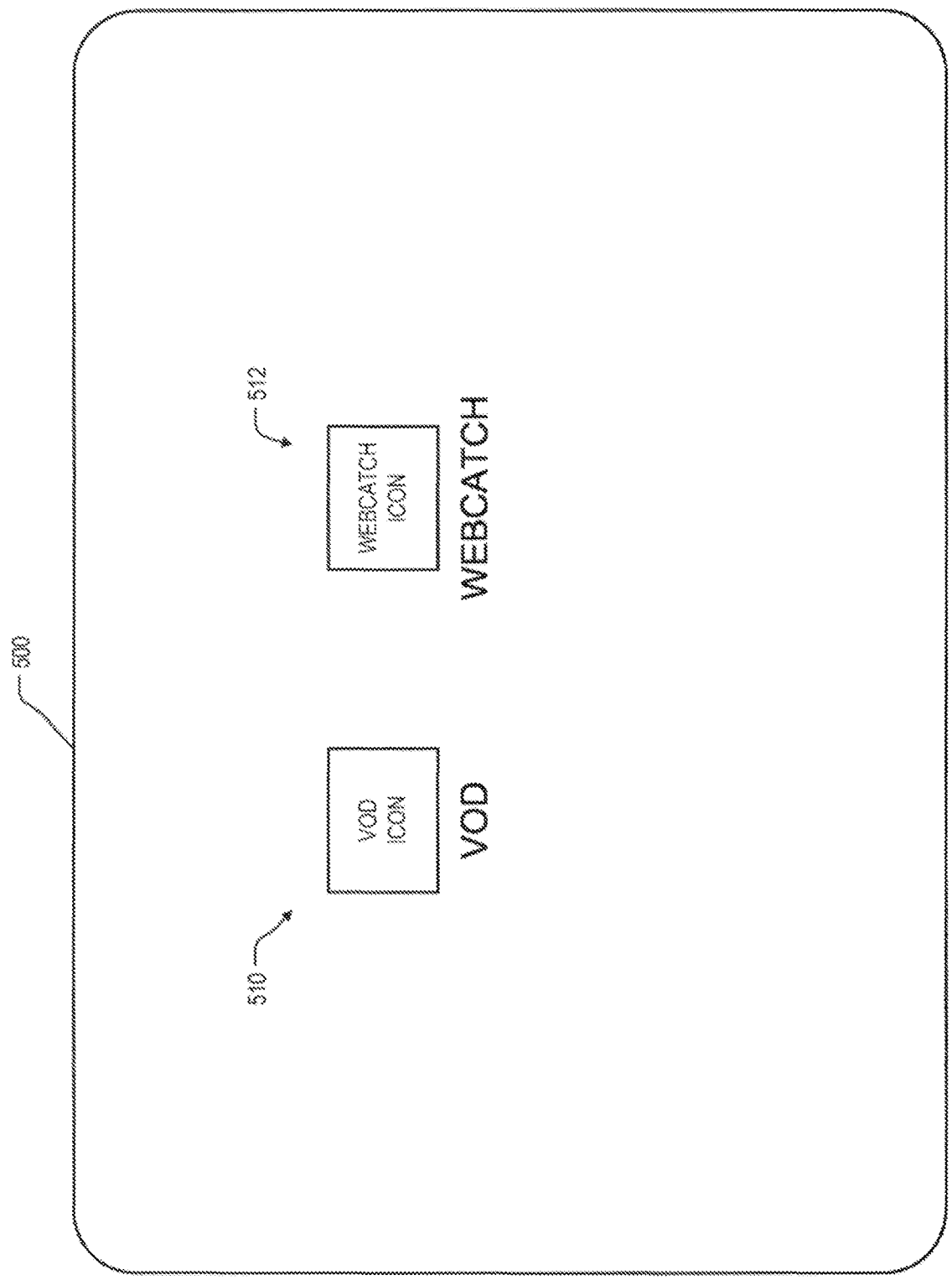

FIG. 5 illustrates a frame of the screen layout 500 for yet another type of asset. This asset allows the user to select among two different other assets, specifically the VOD selection asset as shown in FIG. 4, or the internet video asset as shown in FIGS. 2 and 3. The FIG. 5 asset shows, among other things, a way in which internally navigable multi-segment assets can be made hierarchical, with one such asset calling another. The layout of FIG. 5 has two icons: a VOD icon 510 pre-indicating the VOD selection asset, and a WebCatch icon 512 pre-indicating the internet video asset. It will be appreciated that other icons could be included as well in other embodiments.

The asset depicted in FIG. 5 includes only one collection, which in turn includes only two video segments, one in which VOD icon 510 is highlighted, and one in which WebCatch icon 512 is highlighted. The default sequence in this collection is to play the two segments in sequence, and then to loop back over the entire collection so that the highlighting of the two icons appears to alternate. The duration of each segment is sufficient to allow the user time to press the OK button on the remote during the time that one of the icons is highlighted. When delivering this collection to the STB 114, the content delivery facility 112 also transmits, in conjunction with the transmission of each segment, the asset ID of the corresponding one of the assets. More specifically, while transmitting the segment in which VOD icon 510 is highlighted, content delivery facility 112 also transmits the asset ID of the asset depicted in FIG. 4. Similarly, while transmitting the segment in which Web-Catch icon 512 is highlighted, content delivery facility 112 also transmits the asset ID of the asset depicted in FIG. 2. As with the embodiments of FIGS. 3 and 4, if the user presses the OK button on the remote, the STB will send the asset ID currently held in the STB, upstream to the content delivery facility. The content delivery facility 112 then leaves the collection of FIG. 5, and begins delivering the asset associated with the current asset ID. In the case of FIG. 3, the designated asset is an advertisement video, prepared and delivered to the STB entirely conventionally. In the case of FIG. 4, the designated asset is a movie title, prepared and delivered to the STB entirely conventionally. In the case of FIG. 5, the designated asset is the one depicted in FIG. 2 or the one depicted in FIG. 4, prepared and delivered as described herein.

Splicing and Exit Points

Since in some embodiments different video segments are concatenated together dynamically during playout of a collection, it is desirable that splicing from one to the next appear seamless. Splicing of MPEG encoded streams can be more difficult than splicing of the uncompressed audio and video. For example, P and B frames cannot be decoded without a preceding I frame, so that cutting into a stream after an I frame renders the P and B frames meaningless. P and B frames are also considerably smaller than I frames, so that frame boundaries are not evenly spaced and must be dynamically synchronized between the two streams at the time of the splice. As yet another example, because a video decoder buffer is required to compensate for the uneven spacing of the frame boundaries in the encoded streams, splicing may cause underflow or overflow of the video decoder buffer. In order to overcome these problems and others, each segment is encoded by the preparation facility in such a way that the beginning and end of each segment conform to predetermined constraints that permit a simple transport stream level switch to be made by downstream devices without compromising stream integrity.

In the embodiments described herein, since the user is permitted to navigate away from a currently playing segment at any time during playout, and to jump to the beginning of another segment within the collection or even to a different collection, it is desirable that the preparation facility also encode the segments so that jumps to the beginning of a segment even from the middle of the previous segment will appear seamless as well. In order to accomplish this, the preparation facility encodes the segments in a way that provides multiple exit points within each segment. Each exit point is encoded to conform to the same predetermined constraints, and the locations of the exit points are provided to the content delivery facility 112 in conjunction with the ingestible package. On playout, when the content delivery facility 112 receives an EventNotification that calls for it to jump to a different segment or collection, or even to a different asset altogether, the content delivery facility 112 waits until the next one of the predefined exit points before terminating delivery of the current segment. In some cases the content delivery facility 112 may not terminate delivery until some other subsequent exit point, for example if the immediately next one is too near.

The following set of constraints are used in the encoding at the beginning of each segment and at each of the pre-defined exit points. It will be appreciated that various sets of constraints are possible in different embodiments, and the following set is only an example.

- PES packets are aligned with TS packets. (PCR/PTS/DTS are at known offsets from the beginning of the TS packet.)
- Exactly one video or audio frame per PES packet.
- The last packet before a splice point must have the splicing_point_flag set to '1' and the splice_countdown field set to '0', the splice_type field set to '0000' and DTS_next_AU set to the DTS of the first access unit following the splice point. (Per SMPTE 312M and ISO 13818-1)
- PCR shall be carried on the video PID.
- A new GOP (Group of Pictures) must be started after the splice point, and it must be closed.
- Last picture before the splice point must be an I or P.
- First picture after the splice point must be an I
- The VBV delay at all splice points must be the same.
- The field polarity at all splice points must be the same. (TFF=1)
- The last picture before the splice point must not indicate a repeat field. (RFF=0)
- The first video TS packet after the splice point must have PCR.
- The horizontal resolution of all segments must match.
- The audio frame containing the in and out points must be transmitted. There must be "extra" audio at the beginning and end of each segment.
- The audio coding type (e.g. AC3, Musicam) and bit rate of the audio in all segments must match
- Audio VBV delay must be >0.5 AU duration (Avoids buffer underflow due to lip sync error.)

In addition to the above preparation, the content delivery facility 112 includes a splicing module which performs certain minimal processing at each splice. The processing includes restamping the time base to create a single continuous time base at the output; conditional dropping of audio frames in order to maintain lip sync; and adjusting the delivery time of the transport packets in order to maintain audio and video VBV compliance. The splicer also re-maps input PIDs to common output PIDs.

Package Distribution to Content Delivery Facilities

Content prepared as above is distributed from the content preparation facility 110 to content delivery facilities such as 112 in the form of ingestible packages through conventional mechanisms, such as FTP. The packages differ from conventional packages in that they contain internally navigable multi-segment video. Thus each package can include not only the actual video segments and conventional metadata describing the entire asset, but also additional metadata identifying and describing the individual segments included in the collection, and how navigation among them should be accomplished. The video segments themselves can be delivered to the content delivery facility 112 either separately or as a single, sequentially combined video. Which method is preferable depends on the capabilities of the content delivery facility 112. When a single combined video is used, the metadata contains information that specifies where the transitions from one segment to the next are within the combined video.

Figure 6A:
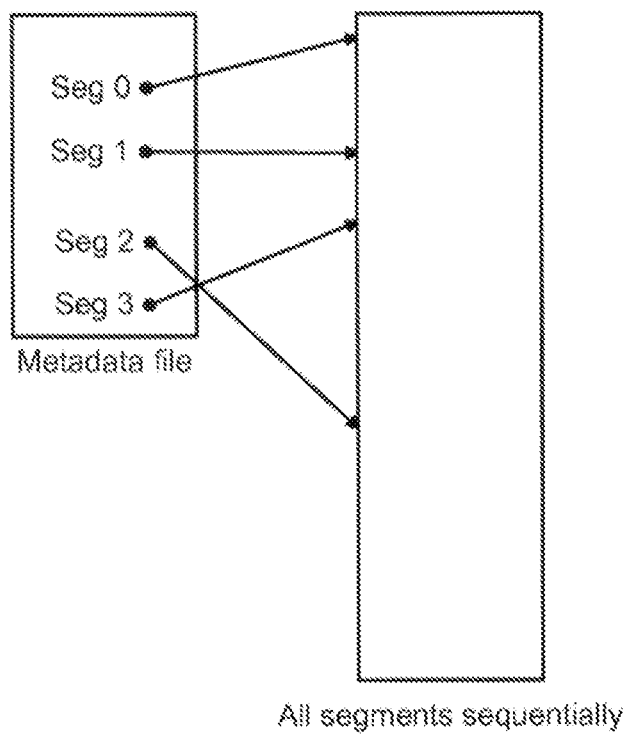
FIGS. 6A, 6B and 6C illustrate respective example arrangements for packaging the metadata and segments.
Figure 6B:
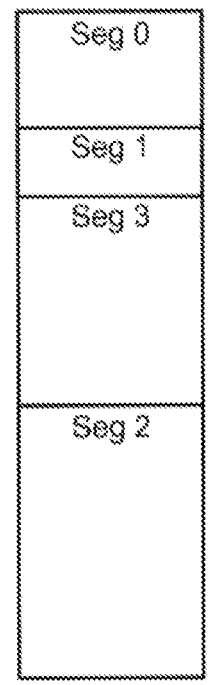
Figure 6C:
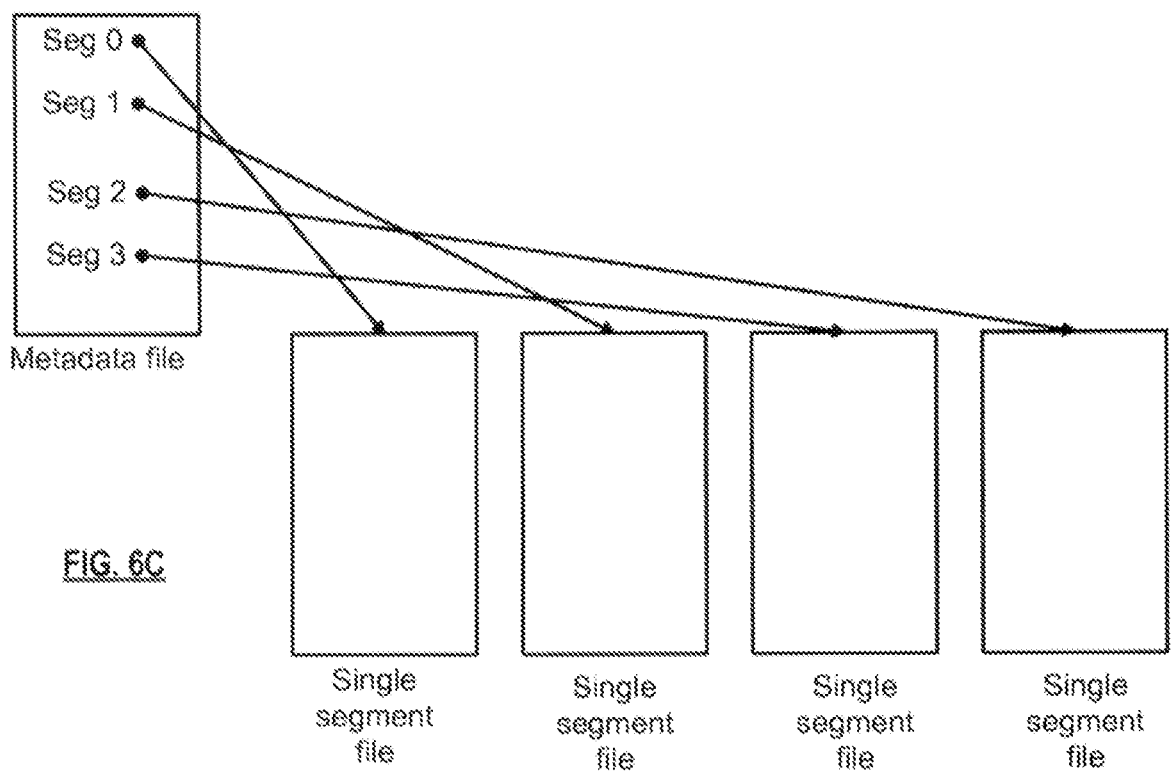

FIGS. 6A, 6B and 6C illustrate three example arrangements for packaging the video segments. In FIG. 6A, all the segments are arranged sequentially in one file and a separate metadata file (or file portion) contains pointers to the starting position of each of the segments. In FIG. 6B, all the segments are arranged sequentially in one file and metadata marking the starting positions of the segments is embedded at the head of each segment. If FIG. 6C, the segments are arranged in separate files, and a separate metadata file contains pointers to each of the files. In yet another arrangement (not shown), the segments and the metadata are encapsulated using markup language like XML. Other arrangements will be apparent to the reader, as well as combinations of arrangements.

The packages conform to all the requirements of conventional Delivery and Presentation systems, in terms of encoding, syntax, packaging, etc. The metadata associated with them signals to the delivery system that these assets are special and contain additional metadata for internal navigation.

Figure 7:
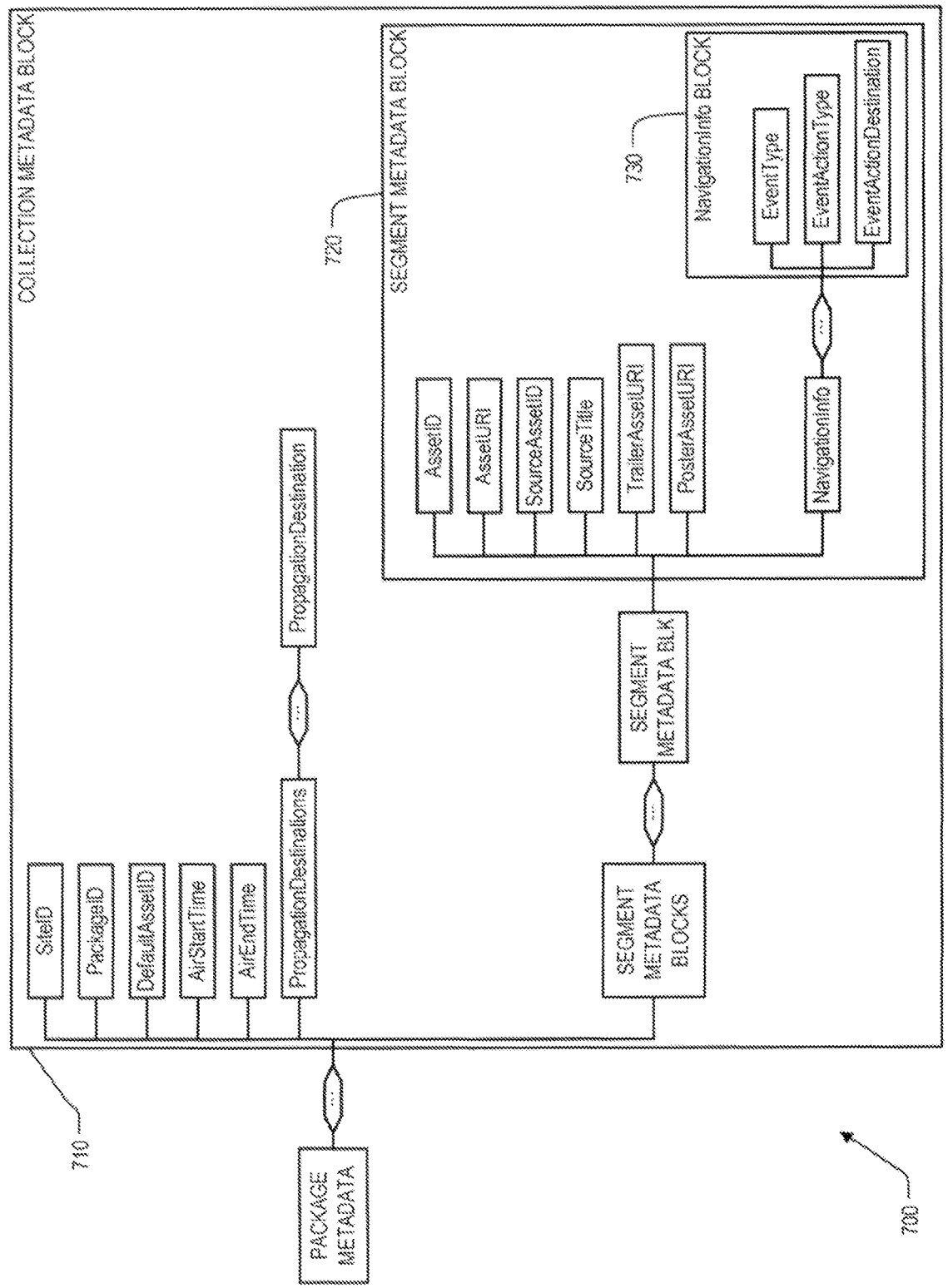
FIG. 7 illustrates the format of metadata in a package in one embodiment.

FIG. 7 illustrates the format 700 of metadata in a package in one embodiment. The package, including both the video segments and the metadata, can be written to or otherwise impressed on a computer readable medium, or several computer readable media. Such computer readable media can include, for example, disk drives, semiconductor memory, optical memory, tape drives, or any other medium or media that can store the package information described herein. The package can be stored all on a single medium, or it can be spread over multiple media which can be, but need not be, in physical proximity with each other. The package can be constructed by writing the package information described herein to the medium or media. Any data processing system with sufficient access to the data and the medium (media) can be programmed to perform the steps necessary to write the package.

The metadata is encapsulated using XML in this embodiment, and for clarity of illustration, the video segments themselves are omitted. Only the package metadata is shown in FIG. 7. This metadata comprises a sequence of collection metadata blocks 710, one for each collection in the package. The sequence in which the collection metadata blocks are set forth in the package defines a "default sequence" of collections in the package. In another embodiment, the "default sequence" can be defined by other means, such as by index numbers associated with each collection, or by an index file that points to the collections in the desired sequence. A collection metadata block 710 contains information about the collection as a whole, such as SiteID and PackageID (identifiers which together identify the package within which the collection is located); a DefaultAssetID (indicating the starting segment in the collection's default sequence of segments); AirStartTime and AirEndTime (indicating lifespan dates and times for the collection); a sequence of PropagationDestinations (indicating content delivery facilities to which the collection should be sent); and a sequence of segment metadata blocks 720.

The sequence in which the segment metadata blocks are set forth in the collection defines a "default sequence" of segments in the collection. As with the default sequence of collections, the default sequence of segments can be defined by other means in other embodiments, such as by index numbers associated with each segment, or by an index file that points to the segments in the desired sequence. A segment metadata block 720 contains information about the individual segment, such as AssetID (an identifier for the current segment); AssetURI (a pointer to the video segment itself); a SourceAssetID (an identifier of the video source from which the current asset was created, such as an internet URL); SourceTitle (title of the video source); pointers to other video content from which the segment was prepared (e.g. for the VOD embodiment of FIG. 4, this information might point to the trailer video and the poster image that was used by the preparation facility 110 to prepare the current segment); and a sequence of NavigationInfo blocks 730 applicable to the current segment.

The NavigationInfo blocks 730 are to be used subsequently by the content delivery facility 112 to program the user's STB with actions to perform in response to particular user input events received by the STB during playing of the current segment, or to determine what action the content delivery facility 112 itself should take in response to particular notifications received from the STB. In a package for an embodiment such as that shown in FIG. 5, in which directional buttons on the user's remote have no meaning, the segment metadata block 720 might contain only one NavigationInfo block 730. This block specifies the ID or URI of a target asset that should be delivered to the user's STB in response to an event indicating that the user has pressed the OK button on the remote. Specifically, the NavigationInfo block 730 within the segment metadablock 720 corresponding to the segment in which VOD icon 510 is highlighted, contains an identifier and/or URI for the asset of FIG. 4. Similarly, the NavigationInfo block 730 within the segment metadablock 720 corresponding to the segment in which WebCatch icon 510 is highlighted, contains an identifier and/or URI for the asset of FIG. 2. In the embodiment of FIG. 7, in the metadata block for either segment, the EventType and EventActionType fields in this NavigationInfo block might contain codes which together indicate "user pressed OK button"; and the EventActionDestination field in this NavigationInfo block might contain the identifier and/or URI for the full asset associated with the current segment.

In a package for an embodiment such as the internet video asset shown in FIG. 2, in which UP and DOWN buttons indicate previous and next segment or internet video clip within the current collection, each of the segment metadata blocks in a collection contains one NavigationInfo block 730 indicating an action to perform in response to an event indicating that the user has pressed the UP button on the remote, and another NavigationInfo block 730 indicating an action to perform in response to an event indicating that the user has pressed the DOWN button on the remote. In both blocks 730, the action to take is impliedly to simply send an EventNotify code upstream to the content delivery facility 112 indicating which segment the user has requested. The NavigationInfo block 730 contains the code to be sent. In one embodiment, the code indicates only which button was pressed, i.e. UP or DOWN. It is left to the content delivery facility 112 to know which segment is the 'current' segment (i.e. the segment that was being transmitted at the time the user pressed the button), and to determine the identifier and location of the requested segment based on the current segment and the particular code received. In another embodiment, the code points to the requested segment directly. The latter embodiment is possible because it is known at the time of content preparation which segment is previous and which segment is next in the default sequence in the collection; pointers directly to those segments can be inserted into the metadata package at that time.

Note that some segments might include only one NavigationInfo block. For example the first segment in the default sequence might not include a NavigationInfo block for user pressing of the UP button, because unless the collection default sequence loops, there is no 'previous' segment. Similarly, the last segment in the default sequence might not include a NavigationInfo block for user pressing of the DOWN button, if there is no 'next' segment. Also, some segments might not include any NavigationInfo blocks at all, for example for segments in which navigation is disabled. Finally, note in the package for FIG. 2, many segments might not include a NavigationInfo block for user pressing of the OK button, since that button has no meaning in FIG. 2. In the FIG. 3 variation, however, the segment metadata block for the segment in which the ad cue 310 appears on the display, would include a NavigationInfo block for user pressing of the OK button. This block would identify the video asset containing the full advertisement.

Returning to the internet video asset depicted in FIG. 2, LEFT and RIGHT buttons indicate previous and next collection. For segments in which these buttons are enabled, the corresponding segment metadata blocks 720 also include one NavigationInfo block 730 containing the code to be sent in response to an event indicating that the user has pressed the LEFT button, and another NavigationInfo block 730 containing the code to be sent in response to an event indicating that the user has pressed the RIGHT button. Again, these codes could indicate only the button pressed, leaving it to the content delivery facility 112 to know the current collection and to resolve the button press to the collection requested, or they could more directly indicate the collection requested.

In a package for an asset such as the VOD selection embodiment of FIG. 4, the roles of the LEFT/RIGHT buttons and the UP/DOWN buttons are reversed, LEFT/RIGHT operating to navigate among segments in the current collection, and UP/DOWN operating to navigate among different collections. The segment metadata blocks 720 include appropriate ones of the NavigationInfo blocks 730 to appropriately identify to the content delivery facility 112 of the desired segment or collection. The VOD embodiment of FIG. 4 also enables the OK button for all segments in all collections. As mentioned, user pressing of the OK button during transmission of the segment corresponding to a particular movie title, causes the content delivery facility 112 to stop delivering the current segment and to start delivering the corresponding movie title itself. To enable this the segment metadata block 720 for each of the segments in each of the collections includes a NavigationInfo block 730 containing a pointer to the movie title itself.

It will be appreciated that the package metadata organization of FIG. 7 is only one example of many that can carry the information required to implement internally navigable multi-segment assets. Numerous other formats will be apparent to the reader. As one additional example, in an embodiment in which certain information is identical from metadata block to block, that information can be removed from the individual blocks and included instead only once at the next higher level of the metadata hierarchy. For example, in an embodiment in which the STB is to return codes fixedly corresponding to the four directional buttons (e.g. always 101 for LEFT, 102 for RIGHT, 103 for UP, 104 for DOWN), then NavigationInfo blocks containing this information can be omitted from the individual segment metadata blocks 720 and included instead only once in the collection metadata block 710. Other variations will be apparent.

The package metadata format shown in FIG. 7 contains all the metadata required for an entire video asset, such as the internet video asset of FIGS. 2 and 3, or the VOD asset of FIG. 4. However, whereas the entire package is maintained addressably to the content preparation facility 110, and addressably to the content delivery facility 112, the entire package need not be transmitted from one to the other for each update. In an embodiment, an ingestible package delivered to the content delivery facility can instead include only updates to the packages previously delivered. In one example, an ingestible package might include the metadata for only one updated collection, or for a subset of collections, or for only one or a subset of individual segments. Other variations will be apparent.

Content Delivery Facility

Figure 8:
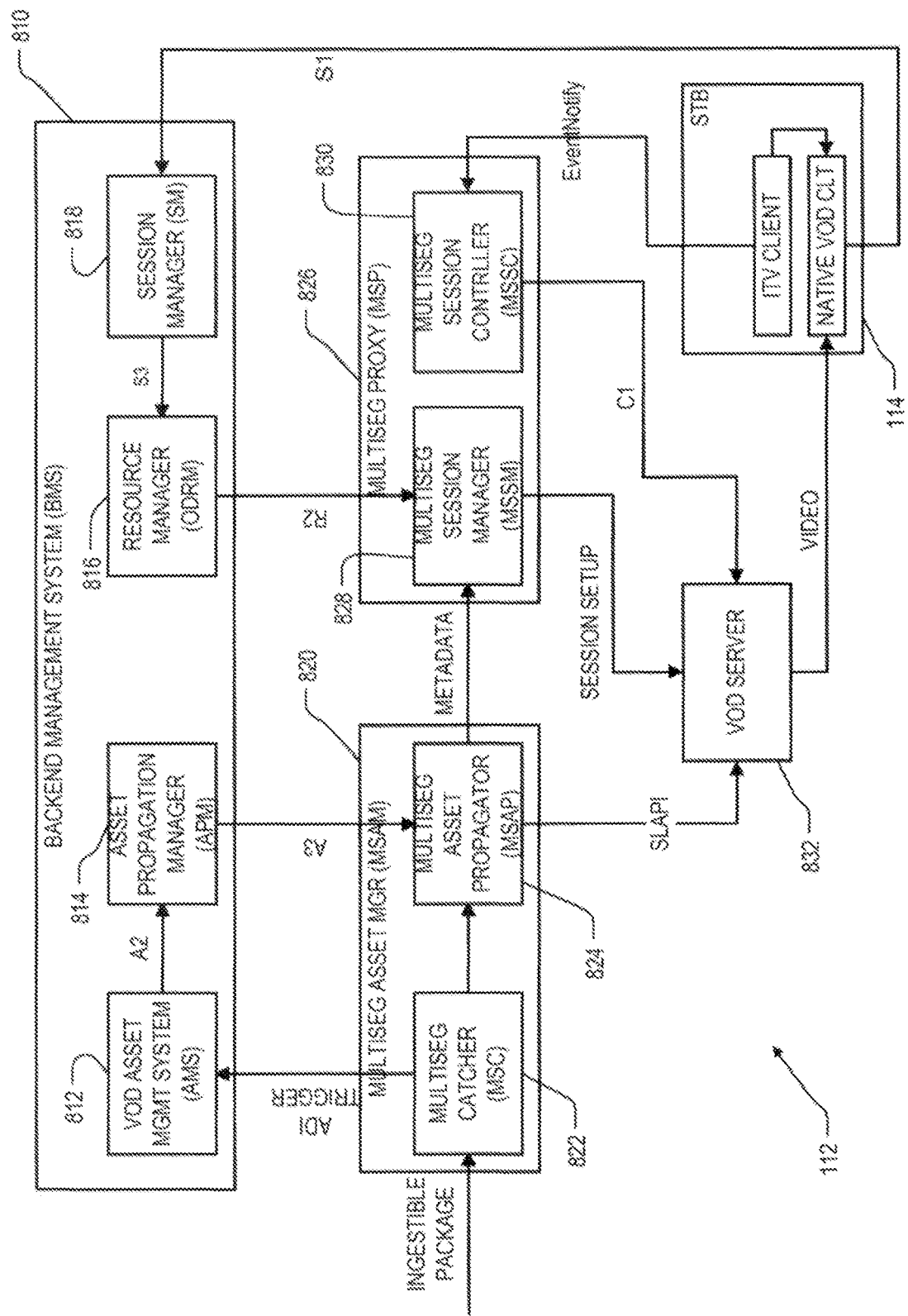
FIG. 8 is a block diagram of pertinent parts of a content delivery facility of FIG. 1.

FIG. 8 is a block diagram of pertinent parts of a content delivery facility 112. The various functions are illustrated in FIG. 8 as being divided among specific modules, but it will be understood that in different embodiments different functions can be combined into one module, or the different functions can be spread over modules in a different manner than that shown in FIG. 8.

Content delivery facility 112 includes a backend management system (BMS) 810, which includes a VOD asset management system (AMS) 812, an asset propagation manager manager (APM) 814, an on-demand resource manager (ODRM) 816 and a session manager (SM) 818. The facility 112 also includes a multi-segment asset manager (MSAM) 820, which includes a multi-segment asset catcher (MSAC) 822 and a multi-segment asset propagator (MSAP) 824. The facility 112 also includes one or more multi-segment asset proxies (MSAP) 826, each of which includes a multi-segment session manager (MSSM) 828 and a multi-segment session controller (MSSC) 830. The facility 112 also includes one or more VOD servers 832, which are the devices that actually transmit streaming video to the STB 114. In an embodiment, server 832 represents a cluster of VOD servers, all of which appear to the other elements of the facility as a single server. The cluster is governed by one of the multi-segment asset proxies 826.

In operation, an internally navigable multi-segment asset is received from the content preparation facility in the form of an ingestible package through an FTP upload. As previously described, this package includes the actual video segments and the associated metadata. The associated metadata includes conventional asset description information (e.g. the information called for in the Asset Distribution Interface (ADI) defined by CableLabs®), and navigation logic (e.g. that in the segment metadata blocks of FIG. 7). The segments in the content package have their own identifiers which are understandable only to multi-segment asset enabled components of the content delivery facility 112, so the package also has associated with it an "alias asset" identifier that identifies the asset as a whole to conventional components of the facility.

On arrival, the ingestible package is recognized by the multi-segment asset catcher 822, which sends an ADI Trigger message to the AMS 812, providing the alias asset identifier for the package. The ADI Trigger message notifies the BMS 810 that a new asset has arrived and will be available for streaming. The asset appears to the BMS 810 similar to a single movie; the BMS 810 does not need to know that it has multiple segments and is internally navigable. AMS 812 then sends a conventional notification to the asset propagation manager 814, which then sends a conventional command to the multi-segment asset propagator 824. When the multi-segment asset propagator 824 receives the latter command it performs the following actions:

Identifies the actual package associated with the alias asset identified in the command;

Extracts the video segments from the package and ingests them directly to the appropriate VOD servers 832; and Extracts the navigation and asset information from the package metadata and sends it to the multi-segment asset proxy 826.

The VOD server 832 is enhanced relative to conventional VOD servers in order to support intra-asset navigation among segments and collections. Since the overall network might include conventional as well as enhanced VOD servers, MSAP 824 delivers the video segments to the VOD servers in such a way that only the enhanced servers ingest them. In one embodiment this is achieved through the use of a field in the ADI trigger message sent by the multi-segment catcher 822 to the AMS 812, available to indicate "capabilities" required of destination VOD servers. The MSC 822 fills the "capabilities" field with a code indicating that the alias asset subject of the ADI trigger can be played only on servers having intra-asset navigation support, and only the enhanced servers are registered in the BMS as supporting that capability.

At the conclusion of the ingestion process, one or more VOD servers 832 now contain all the individual video segments from the package, and the multi-segment asset proxy 826 contains all required metadata from the segment metadata blocks 720 of the package. These data (the video segments and the metadata) need not be stored physically in the VOD servers 832 or multi-segment asset proxy 826, so long as they are stored "addressably" to the VOD servers 832 or multi-segment asset proxy 826. As used herein, data is stored "addressably" to a component if the component knows how to reach it and can cause it to be played, either by itself retrieving it and transmitting it, or by causing another component to do so.

Streaming Content Delivery

As for conventional video assets, internally navigable multi-segment assets are streamed to end-users' client devices, such as STB 114, in accordance with a standard and well-known session-oriented protocol. Two examples of such protocols are those defined by Time Warner Cable's Next Generation On Demand (NGOD) architecture, and those defined by Comcast's Interactive Services Architecture (ISA). See U.S. Patent Publication No. 20070033282 and Time Warner Cable, "Pegasus Interactive Services Architecture" Version 1.4, (Jun. 5, 2003), both incorporated herein by reference. As used herein, a session-oriented protocol is one which delivers content to client devices within defined "sessions". A "session", as used herein, is a unique bandwidth and time allocation between head-end equipment and one end-user client device (e.g. STB). In various embodiments other resources may also be allocated to particular sessions, such as a particular VOD server, and a particular RF carrier frequency on which the content is to be delivered. A "session" also is typically given a unique session ID, by which various components of the system can refer to it. A session-oriented protocol includes mechanisms for setting up a session (including allocating the bandwidth and time for the session, and assigning the session ID), and mechanisms for tearing one down (including releasing the bandwidth allocation). Session setup may also include interacting with billing and subscriber management systems to ensure that the client device has the proper rights to view the content requested for the session.

Figure 9:
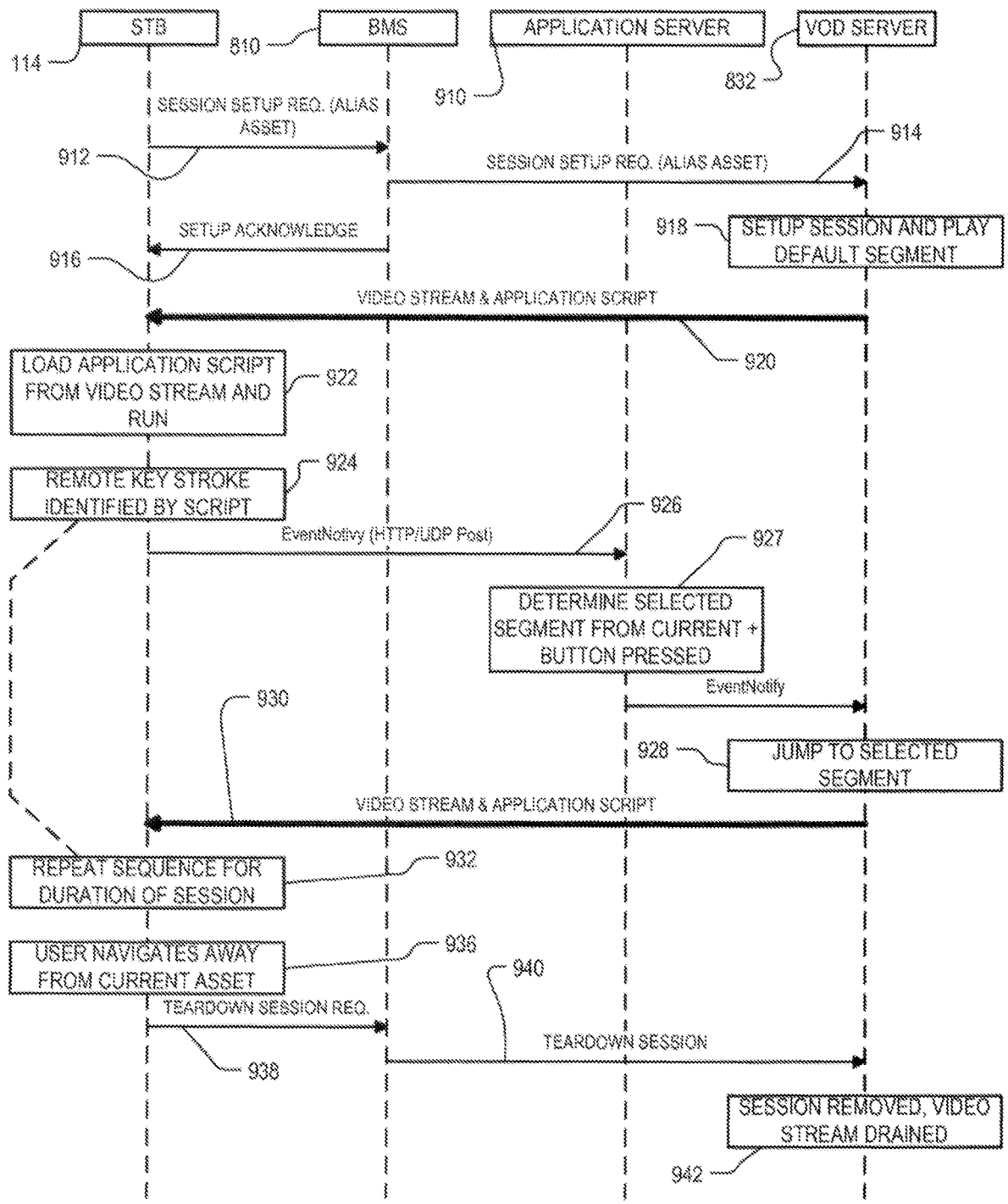
FIG. 9 is a sequence diagram illustrating an example session in which an internally navigable multi-segment asset is delivered to a set-top box.

FIG. 9 is a sequence diagram illustrating an example session in which an internally navigable multi-segment asset is delivered to a set-top box. The pertinent components involved in the session are the STB 114, the BMS 810, an application server (part of multi-segment session controller 830), and VOD server 832. As used herein, the BMS 810, application server 910 and VOD server 832 are all considered to be part of the "head-end equipment", though in other embodiments, the "head-end equipment" need only include sufficient equipment to perform the specific functions described below with respect to FIG. 9. It will be appreciated also that not all the components of "head-end equipment" need be disposed in one physical location.

Referring to FIG. 9, a user is cued by conventional means, such as a VOD menu, to play a particular asset that happens to be an internally navigable multi-segment asset. Upon selecting the asset, the native VOD client in STB 114 issues a session setup request to the BMS 810, specifying the alias asset ID of the requested asset. The BMS 810 performs appropriate session setup functions including interacting with billing and subscriber management systems, assigning a unique session ID, selecting and allocating a VOD server 832 which holds the asset represented by the alias asset ID, and allocating bandwidth, time and a carrier frequency on which the asset is to be transmitted to the STB. In step 914 the BMS 810 then sends a session setup request to the multi-segment asset proxy 826 for the allocated VOD server 832. This request includes, among other things, the alias asset ID, the session ID, and the carrier transmission frequency allocated. In step 916 the BMS 810 also transmits an acknowledgement to the STB 114, including, among other things, the session ID and the allocated carrier frequency. The multi-segment asset proxy 826, upon receipt of the session setup request in step 914, determines the default starting segment in the default starting collection of the multi-segment asset corresponding to the alias asset ID, and forwards the session setup request to the appropriate VOD server 832 (step 918).

In step 920, the VOD server 832 begins transmitting the video segments in the default starting collection toward the client device in accordance with the default sequence for that collection. The video is transmitted in accordance with well-known transmission standards and protocols, such as MPEG2 or MPEG4. These transmission protocols also allocate a small amount of bandwidth usable for transmission of an application script, executable on the ITV client in the STB. In the system of FIG. 8, each segment of the asset has a respective application script associated with it, and which is transmitted to the STB in association with the corresponding segment video. Preferably the association with segment video is established by transmitting the application script in-band together with the corresponding segment video, and in an embodiment, repeatedly throughout the transmission of the segment. In one embodiment, the scripts and their transmission protocols conform to the specifications set forth in the following CableLabs® documents, all incorporated by reference herein: Cable Television Laboratories, Inc., "OpenCable Enhanced TV Application Messaging Protocol 1.0" ETV-AM1.0 09/21/07 Issued I04"; Cable Television Laboratories, Inc., "OpenCable ETV-Binary Interchange Format 1.0" ETV-BIF1.0 09/21/07 Issued I04; Cable Television Laboratories, Inc., "Enhanced TV User Interface Guidelines" ETV-UIG 04/18/06 Released V02; Cable Television Laboratories, Inc., "Enhanced TV Operational Guidelines" ETV-OG 07/14/06 Released V01; and Cable Television Laboratories, Inc., "OpenCable Receiver Metrics Gathering Specification" SP-METRICS 04/16/07 Issued I02. In other embodiments, the application scripts and their transmission protocols can conform to other specifications.

The application scripts are derived from the information in the NavigationInfo metadata blocks 730. In one embodiment they are constructed by the content preparation facility 110 and delivered to the content delivery facility 112 as part of the ingestible package. Alternatively they can be constructed by MSC 822 from the NavigationInfo metadata blocks 730 as part of the ingestion process, and stored until needed. In yet another embodiment only the NavigationInfo metadata blocks 730 are stored, and the application scripts are constructed on-the-fly as each segment is about to be transmitted.

The scripts themselves can be very simple. The following is example pseudocode for such a script, for a segment in which the NavigationInfo metadata blocks 730 define actions for all four directional navigational buttons as well as for the OK button:

ITV client detects button-press event on remote
If button is 'LEFT', then send EventNotify signal to application server 910 with code 101
If button is 'RIGHT', then send EventNotify signal to application server 910 with code 102
If button is 'UP', then send EventNotify signal to application server 910 with code 103
If button is 'DOWN', then send EventNotify signal to application server 910 with code 104
If button is OK, then send EventNotify signal to application server 910 with code 100; also invoke default script on STB 114 to play the full asset corresponding to the current segment (including forwarding to the VOD client the identification of the appropriate asset to play)
If button is not recognized, invoke the STB default script to handle the user input in a conventional manner.

Note that the full asset (if there is one) corresponding to each segment was identified in a NavigationInfo block 730 for that segment, and that asset identification is what gets embedded in the application script for forwarding to the VOD client. Note also that as previously mentioned, in another embodiment the codes sent in the EventNotify signals to the MSAP 826 contain the internal asset identifier for the segment selected by the user through the button press, rather than a fixed code corresponding to each respective one of the directional buttons. Still further, note that in an embodiment, the application script contains actions only for user input events that are included in the NavigationInfo blocks 730 for the corresponding segment. If the currently playing asset is that depicted in FIG. 5, for example, then the scripts for all segments would omit any action to be performed in response to presses of any of the directional buttons. Finally, note that while an internally navigable multi-segment asset is playing, the standard VOD "trick-mode" commands of fast-forward, rewind, and pause/play may be disabled in order to avoid confusing situations.

In step 922, the STB 114 begins playing the received video segment(s). Each transmission of the application script causes the STB 114 to load the script into the ITV client and execute it.

In a step 924, while the user is viewing the video asset segments, the user presses a key on the remote to indicate a selection among navigational choices. Note that in other embodiments, other mechanisms can be used to enable the user to indicate a selection among navigational choices, such as, for example, buttons on the STB 114 front panel, or voice commands. The ITV client on STB 114 executes the current application script, and transmits the corresponding EventNotify signal to the application sever 910 (step 926). In an embodiment, the EventNotify signal is transmitted using an HTTP Post command with an XML structure such as the following passed as a variable:

```
<?xml version="1.0" encoding="utf-8"?>
<EventDetails>
    SessionID="DDBE18377"
```

```
EventID="100"
EventData=""
<EventDetails/>
``` where SessionID attribute is a unique identifier of the current session/client; and EventID carries the code corresponding to the button pressed.

The application server 910 then determines the segment intended for selection by the user (step 927). In an embodiment in which the EventNotify signals contain only a fixed code corresponding to each button, the application server 910 determines the selected segment in dependence upon its knowledge of the current segment that was being transmitted at the time of the button press, and the received code indicating the particular button pressed. For example, if the current segment is the third segment in the current collection, and the received code indicates that the user pressed the LEFT button, and the currently playing asset is organized such that the LEFT button indicates Previous segment, then the application server determines here that the selected segment is the one that is previous to the current segment in the default segment sequence of the current collection.

In step 928, the application server 910 sends a message to the VOD server 832 to jump to a new segment, and identifies the internal segment ID corresponding to the selected segment. Without tearing down the session, the VOD server 832 then awaits the next exit position within the current segment (if seamless splicing is in use), stops transmitting the current segment, and jumps to the selected segment as identified by the application server 910. In step 930, the VOD server 832 continues transmitting from the beginning of the selected segment. The application script corresponding to the new segment is also transmitted to the STB in the manner set forth above.

In step 932, during transmission of this segment or a subsequent segment, the user may press another button on the remote. This again invokes the then-current application script and the process repeats with step 924 as set forth above.

Note that if the user does not press any navigation buttons before the conclusion of a segment, the VOD server 832 issues a segment end event to multi-segment asset proxy 826. Assuming the default sequence of segments in the current collection includes one that is 'next' after the current segment, the multi-segment asset proxy 826 determines which one it is, and notifies the VOD server 832 to resume transmission with the next segment. Alternatively, the default sequence can be loaded into the VOD server 832, which plays through it unless interrupted with additional commands from the MSP 826. In either case, play-through occurs without tearing down the session.

At some point, in step 936, either a timeout expires with no key presses, or the user navigates away from the current multi-segment asset, for example by pressing the OK button or the MENU or GUIDE buttons. When this occurs, in step 938, the STB 114 issues a request to tear down the current session. The BMS receives this request and deallocates all the resources that had been allocated to the session. The session teardown message is then forwarded to the VOD server 832 (step 940), which drains the video stream and proceeds to its next task (step 942).

It can be seen that the embodiments described above provide a new "lean-back" experience made possible by the use of internally navigable multi-segment assets. The user interface for navigating amongst the segments is encoded into the collection itself. It is not necessary for the viewer to go to a menu to navigate to a different video, as is commonly required in conventional VOD systems. Instead, the viewer simply issues navigation commands via the remote (or via another command input device). The navigation commands are substantially intuitive based on the visual cues in the on-screen image. Additionally, no changes to user equipment or client applications are required. This is a major advantage for the system as the deployment of new applications to STBs is difficult.

The ability to jump among clips or segments within a single composite asset is a significant benefit also because by avoiding the lengthy delays of session setup and teardown, it renders the playing of short videos practical. As mentioned, it is typical in a VOD system that the starting of a new movie or other asset requires the head end servers to access subscriber databases to determine the user's authorization to view the asset, and/or to effect payment for the asset, often including interaction with the user before the asset can be transmitted. These delays will seem inordinately lengthy for jumping among internet video clips which often are only a few seconds long. Moreover, the brevity of internet clips also increases the likelihood that the user would want to view a much larger number of them in a sitting. Even a short startup delay will add up to a very long period of waiting when multiplied by this number of clips. Again, by combining the clips into a single asset and providing the user the capability to jump around within the asset, no more than one session setup delay is incurred for the entire collection.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Also as used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Documents incorporated by reference herein (including the provisional application) are incorporated for their substantive teachings, not for their definitions or usage of terms. That is, while reference may be made to these documents for industry use of terms, their status as incorporated documents is not intended to afford them any special weight when interpreting terms.

The invention may be practiced as a method or as a system adapted to practice the method. The method can be viewed from the perspective of the head-end equipment, and may also be viewed from the perspective of the client device (e.g. STB). The invention may also be viewed as an article of manufacture such as media impressed with logic to carry out the method, and as an article of manufacture such as media impressed with an asset or parts of an asset as described herein.

While the invention is described herein by reference to preferred embodiments and examples detailed above, it is understood that these examples are intended in an illustrative rather than in a limiting sense. Numerous variations are possible within the scope of the invention. As one example, whereas the assets depicted in FIGS. 2-4 allow two degrees of navigational freedom (previous/next clip, and previous/next collection), and the asset depicted in FIG. 5 allows hierarchical navigation among assets, other navigational paradigms are possible as well. Some of these might involve buttons on the remote other than UP, SOWN, LEFT and RIGHT. It is contemplated that these modifications and others will readily occur to those skilled in the art, which modifications will be within the spirit of the invention and the scope of the following claims.

We claim:

1. One or more non-transitory computer-readable storage mediums storing one or more sequences of instructions for playing video content on a user's client device in a video-on-demand system, the video content including a first collection of video segments, the video segments having a predefined default sequence in the first collection, wherein execution of the one or more sequences by one or more processors cause:
    establishing a streaming video session according to a session-oriented protocol for streaming video from head-end equipment;
    receiving from head-end equipment a script executable by the client device, the script operable to transmit codes toward the head-end equipment in response to and indicative of user selection among navigational choices;
    receiving transmission of video segments in the first collection in accordance with the default sequence for the first collection;
    in response to detection during the streaming video session of user selection of a selected one of the segments in the first collection, transmitting toward the head-end equipment a code indicated by the script that identifies the selected segment without tearing down the streaming video session; and
    subsequently, before tearing down the streaming video session, receiving transmission of the selected segment.

2. The one or more non-transitory computer-readable storage mediums according to claim 1, wherein the user selection of a selected segment is detected during transmission of a current one of the video segments in the first collection, wherein the script is operable to transmit a first code toward the head-end equipment in response to user selection of a previous segment in the predefined default sequence and a second code toward the head-end equipment in response to user selection of a next segment in the predefined default sequence, and wherein the transmitted code is a member of the group consisting of the first and second codes.

3. The one or more non-transitory computer-readable storage mediums according to claim 1, wherein the selected segment has an identifier associated therewith, and wherein the transmitted code includes the identifier.

4. The one or more non-transitory computer-readable storage mediums according to claim 1, wherein at least a subset of the segments in the first collection have associated therewith respective scripts each operable to transmit codes toward the head-end equipment in response to and indicative of user selection among navigational choices, and wherein receiving from head-end equipment a script executable by the client device comprises:
    in association with receipt of each current segment in the subset of segments, receiving from the head-end equipment the script associated with the current segment.

5. The one or more non-transitory computer-readable storage mediums according to claim 4, wherein the script associated with each given one of the segments in the subset includes one or more of a first identifier for the segment that precedes the given segment in the default sequence or a second identifier for the segment that follows the given segment in the default sequence, and wherein the transmitted code comprises or corresponds to the first identifier or the second identifier.

6. The one or more non-transitory computer-readable storage mediums according to claim 1, wherein a navigational code is transmitted during transmission of a current one of the segments, and wherein the step of receiving transmission of the selected segment begins before completing receipt of the current segment.

7. The one or more non-transitory computer-readable storage mediums according to claim 1, wherein the video content further includes a second collection of video segments, the segments in the second collection being addressably stored to head-end equipment, and wherein execution of the one or more sequences of instructions further cause:
    in response to detection during the streaming video session of user selection of the second collection, transmitting toward the head-end equipment a code indicated by the script that identifies the second collection without tearing down the streaming video session.

8. The one or more non-transitory computer-readable storage mediums according to claim 1, wherein a particular one of the segments in the first collection is associated with a particular video asset, and wherein execution of the one or more sequences of instructions further cause:
    in response to a user asset selection request detected during receipt of the particular segment:
        tearing down the streaming video session according to the session-oriented protocol, and
        initiating a new streaming video session for receiving the particular video asset from the head-end.

9. The one or more non-transitory computer-readable storage mediums according to claim 1, wherein at least a subset of the video segments in the first collection are associated with respective video assets deliverable toward the client device, and wherein execution of the one or more sequences of instructions further cause:
    receiving, in association with receipt of each of given one of the video segments in the subset, an asset identifier for the video asset associated with the given video segment.

10. The one or more non-transitory computer-readable storage mediums according to claim 1, wherein each segment, in at least a subset of the first collection, includes spatially composited therewith one or more of a first cue that visibly pre-indicates the segment that is next in the default sequence or a second cue that visibly pre-indicates the segment that is previous in the default sequence.

11. An apparatus for playing video content on a user's client device in a video-on-demand system, the video content including a first collection of video segments, the video segments having a predefined default sequence in the first collection, comprising:
    one or more processors; and one or more non-transitory computer-readable storage mediums storing one or more sequences of instructions, which when executed, cause:

establishing a streaming video session according to a session-oriented protocol for streaming video from head-end equipment;

receiving from head-end equipment a script executable by the client device, the script operable to transmit codes toward the head-end equipment in response to and indicative of user selection among navigational choices;

receiving transmission of video segments in the first collection in accordance with the default sequence for the first collection;

in response to detection during the streaming video session of user selection of a selected one of the segments in the first collection, transmitting toward the head-end equipment a code indicated by the script that identifies the selected segment without tearing down the streaming video session; and and subsequently, before tearing down the streaming video session, receiving transmission of the selected segment.

12. The apparatus according to claim 11, wherein the user selection of a selected segment is detected during transmission of a current one of the video segments in the first collection, wherein the script is operable to transmit a first code toward the head-end equipment in response to user selection of a previous segment in the predefined default sequence and a second code toward the head-end equipment in response to user selection of a next segment in the predefined default sequence, and wherein the transmitted code is a member of the group consisting of the first and second codes.

13. The apparatus according to claim 11, wherein the selected segment has an identifier associated therewith, and wherein the transmitted code includes the identifier.

14. The apparatus according to claim 11, wherein at least a subset of the segments in the first collection have associated therewith respective scripts each operable to transmit codes toward the head-end equipment in response to and indicative of user selection among navigational choices, and wherein receiving from head-end equipment a script executable by the client device comprises:

in association with receipt of each current segment in the subset of segments, receiving from the head-end equipment the script associated with the current segment.

15. The apparatus according to claim 14, wherein the script associated with each given one of the segments in the subset includes one or more of a first identifier for the segment that precedes the given segment in the default sequence or a second identifier for the segment that follows the given segment in the default sequence, and wherein the transmitted code comprises or corresponds to the first identifier or the second identifier.

16. The apparatus according to claim 11, wherein a navigational code is transmitted during transmission of a current one of the segments, and wherein the step of receiving transmission of the selected segment begins before completing receipt of the current segment.

17. The apparatus according to claim 11, wherein the video content further includes a second collection of video segments, the segments in the second collection being addressably stored to head-end equipment, and wherein execution of the one or more sequences of instructions further cause:

in response to detection during the streaming video session of user selection of the second collection, transmitting toward the head-end equipment a code indicated by the script that identifies the second collection without tearing down the streaming video session.

18. The apparatus according to claim 11, wherein a particular one of the segments in the first collection is associated with a particular video asset, and wherein execution of the one or more sequences of instructions further cause:

in response to a user asset selection request detected during receipt of the particular segment:
tearing down the streaming video session according to the session-oriented protocol, and
initiating a new streaming video session for receiving the particular video asset from the head-end.

19. The apparatus according to claim 11, wherein at least a subset of the video segments in the first collection are associated with respective video assets deliverable toward the client device, and wherein execution of the one or more sequences of instructions further cause:

receiving, in association with receipt of each of given one of the video segments in the subset, an asset identifier for the video asset associated with the given video segment.

20. The apparatus according to claim 11, wherein each segment, in at least a subset of the first collection, includes spatially composited therewith one or more of a first cue that visibly pre-indicates the segment that is next in the default sequence or a second cue that visibly pre-indicates the segment that is previous in the default sequence.

\* \* \* \* \*